E. A. MOUCHE.
INCLINED SAW.
APPLICATION FILED FEB. 20, 1917.

1,244,232.
Patented Oct. 23, 1917.

Inventor
E. A. Mouche
by
W. E. Evans
Attorney.

UNITED STATES PATENT OFFICE.

EMILE AUGUSTE MOUCHE, OF LYON, FRANCE.

INCLINED SAW.

1,244,232. Specification of Letters Patent. Patented Oct. 23, 1917.

Application filed February 20, 1917. Serial No. 149,920.

*To all whom it may concern:*

Be it known that I, EMILE AUGUSTE MOUCHE, a citizen of the French Republic, residing at 61 Rue de Bonnel, Lyon, France, have invented certain new and useful Improvements Relating to Inclined Saws, of which the following is a specification.

This invention relates to a method of mounting saws coupled at a variable distance apart and adapted to the spindle of any machine tool.

The apparatus according to the invention is constructed more particularly for making tenons or enfourchements of variable dimensions, while being equally applicable for the production of grooves or rabbets.

In the accompanying drawing a constructional form is illustrated, in which—

Figure 1:
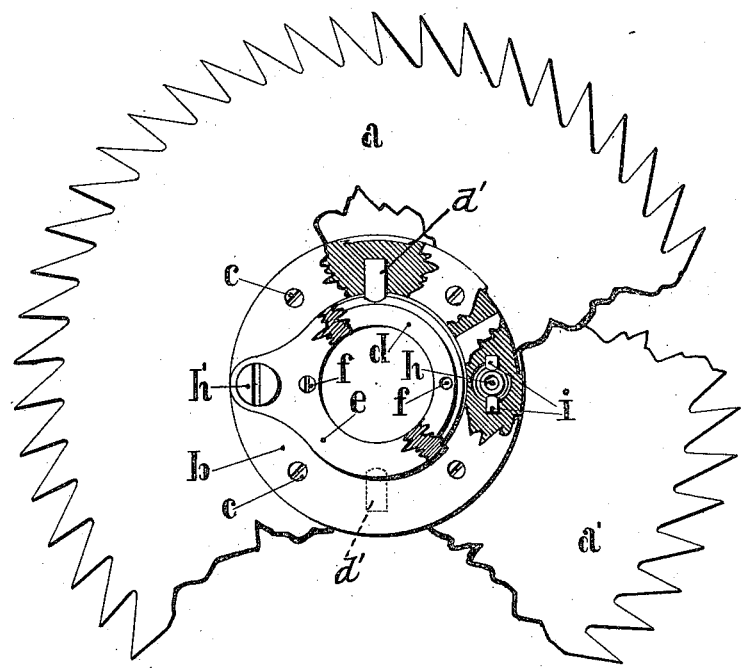
Figure 1 is a plan with parts broken away.
Figure 2:
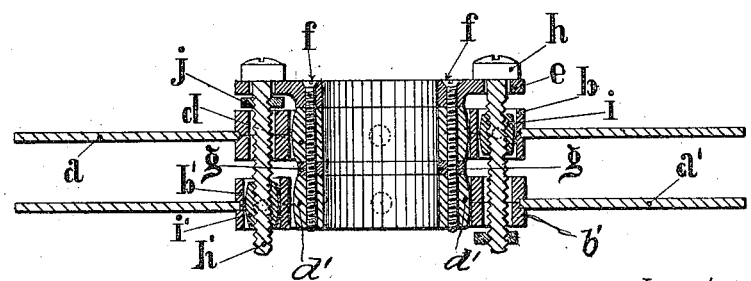
Fig. 2 is a corresponding section.

Two circular saws $a$ and $a'$ provided centrally with a hole are fitted respectively within circular grooves provided within the periphery of crowns $b$ and $b'$ each of which latter is formed in two symmetrical parts connected together by means of screws $c\ c$.

The crowns $b$ and $b'$ carry two concentric rings $d\ d$ mounted upon pivots $d'$. The diameter of the rings $d\ d$ is equal to the diameter of the tool carrying spindle upon which the arrangement is mounted. The upper part of the ring $d$ receives an assembling disk $e\ e$ rendered integral with the rings $d\ d$ by two screws $f\ f$ which pass through the respective rings $d\ d$.

It will be understood that the distance apart of the respective crowns $b$ and $b'$ and consequently of the saws $a$ and $a'$ is capable of regulation at will by the interposition of a removable ring $g$ of variable thickness.

At the two lateral extremities of the disk $e$ and on an axis perpendicular to the axes of the pivots of the rings $d$ and $d$ pass freely two regulating screws $h$ and $h'$ which engage with the internal screw threads of the two pivoting sleeves, the one of which $i$ is mounted in the crown $b$ and the other $i'$ in the crown $b'$. These two pivoting sleeves $i$ and $i'$ oscillate upon their respective axes at the same time and simultaneously with the rings $d$ and $d$ which pivot upon their respective axes parallel to those of the sleeves $i$ and $i'$.

After having adjusted the distance apart of the saws $a$ and $a'$ and interposed between them the intermediate ring $g$ which has been selected of a convenient thickness, in order to regulate the inclination of the saws which are coupled by the screws $f\ f$ by which the rings $d$ and $d$ are rendered integral with the disk $e$, it suffices to operate the two screws $h\ h'$ in a convenient way in order to obtain the angle of working desired.

In order to avoid the loose working or unscrewing which may be produced in operation, lock nuts $j\ j$ may be mounted upon the regulating screws $h\ h'$.

I claim:

1. Two saws fitting within grooves provided in the periphery of two respective crowns within which are respectively disposed two concentric pivoting rings which are rendered integral with a disk through whose ends pass in a direction perpendicular to the pivoting axes of the said rings two regulating screws which engage within pivoting sleeves the one being mounted in the upper crown and the other within the lower crown, these two pivoting sleeves oscillating upon their respective axes simultaneously and parallel with the axes upon which the rings pivot.

2. An apparatus according to claim 1 in which the separation of the respective saws is regulated at will by the interposition of a removable ring of variable thickness.

3. An apparatus according to claims 1 and 2, characterized in that the degree of inclination of the saws is obtained by the mere operation of regulating screws mounted in position with locking sleeves which prevent the loose working or unscrewing in the course of operation.

EMILE AUGUSTE MOUCHE.

Witnesses:
PIERRE OSIRIS GUILLON,
HENRI DUBOCAGE.